United States Patent Office 2,802,877
Patented Aug. 13, 1957

2,802,877
PREPARATION OF O,O'-THIODIPHENOL

Thomas Houtman, Midland, Mich., assignor to The Dow Chemical Company, Midland, Mich., a corporation of Delaware No Drawing. Application July 8, 1954,
Serial No. 442,187

4 Claims. (Cl. 260—609)

This invention relates to the preparation of o,o'-thiodiphenol, i. e., 2,2'-dihydroxydiphenyl sulfide. It pertains especially to a method for preparation of o,o'-thiodiphenol from phenothioxin.

The compound herein referred to as o,o'-thiodiphenol is sometimes elsewhere referred to as o,o'-thiobisphenol and as 2,2'-dihydroxydiphenyl sulfide and can be represented by the following structural formula:

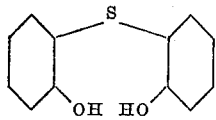

The compound herein referred to as phenothioxin is sometimes elsewhere referred to as phenoxathiin, as dibenzothioxin and as phenoxthin and can be represented by the following structural formula:

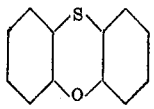

It has now been discovered that o,o'-thiodiphenol can be prepared from phenothioxin by treating the latter with an alcoholic strong alkali at elevated temperature.

A preferred procedure for practicing the invention can be illustrated by the following example.

To a solution prepared by admixing 264 gram of potassium hydroxide (having an assay of 85 percent by weight potassium hydroxide and containing about 13 percent water) and 350 mls. of methanol, there was added 200 grams of phenothioxin and the resulting mixture was enclosed in a stainless steel autoclave. The reaction mixture was heated at autogenous pressure to a temperature of about 195° C. and was held at that temperature for about three hours, with agitation. After cooling and after being removed from the autoclave, the reaction mixture was filtered and the filtrate was acidified with concentrated hydrochloric acid, whereupon there was formed a white precipitate of o,o'-thiodiphenol. After filtering, washing and drying, there remained 200 grams of o,o'-thiodiphenol, which, when recrystallized from ethanol, melted at 139.5° to 140° C. The yield of o,o'-thiodiphenol corresponded to about 92 percent of theoretical, based on the quantity of phenothioxin taken.

The above procedure, whereby phenothioxin is converted to o,o'-thiodiphenol, can be modified. In place of all or part of the potassium hydroxide, there can be substituted another alkali metal hydroxide, e. g. sodium hydroxide. In place of all or part of the methanol, there can be substituted another lower aliphatic alcohol, e. g. ethanol. The proportions of ingredients charged to the reaction mixture can also be varied. It is preferable that an excess of alkali metal hydroxide be employed relative to the phenothioxin, i. e., at least two molecular proportions of alkali for each molecular proportion of phenothioxin by weight. The alcoholic reaction mixture preferably contains a minor proportion of water, e. g. from about 2 to about 10 percent by weight of the reaction mixture. The water can be added in the form of alkali metal hydroxide containing water, or as water-containing alcohol. While the proportion of alcoholic solvent is not particularly critical, such a proportion is preferably employed that the reaction mixture is a fluid liquid solution and that the concentration of alkali metal hydroxide therein at the beginning of the reaction is in the order of 20 to 40 percent by weight of the entire reaction mixture.

The reaction is carried out at a pressure at least as great as the autogenous pressure in order to maintain the reaction mixture substantially in the liquid phase. The reaction can be carried out at temperatures between about 125° and about 240° C., usually between 150° and 240° C., and preferably between 170° and 210° C., the time required to effect substantially complete conversion of phenothioxin to o,o'-thiodiphenol being inverse to the reaction temperature.

The reaction can be carried out in a continuous manner, e. g. by passing the reaction mixture through an enlongated tubular reactor under reaction conditions.

In a manner similar to that just described, nuclearly substituted derivatives of o,o'-thiodiphenol can be prepared from the appropriate nuclearly substituted phenothioxin. For example, alkylphenothioxins, alkoxyphenothioxins and halophenothioxins can be converted to the corresponding substituted o,o'-thiodiphenols by the method of this invention.

o,o'-Thiodiphenol and related compounds are known to be useful as fungicidal and bactericidal agents (see Marsh and Butler, Ind. and Eng. Chem. 42, 839 (1950) and Pfleger et al., Z. Naturforschg. 4b, 344–50 (1949)), as stopping agents for emulsion polymerization of styrene-butadiene (see Wakefield and Bebb, Ind. and Eng. Chem. 42, 839 (1950) and Dunbrooke, India Rubber World 117, 525 1948)), and for stabilization of rubber (see U. S. Patent 2,581,930, issued January 8, 1952, to H. E. Albert).

I claim:
1. A method for the preparation of o,o'-thiodiphenol which comprises heating a mixture consisting essentially, by weight, of about 27 percent phenothioxin, about 30 percent potassium hydroxide, about 5 percent water and about 38 percent methanol at a temperature of about 195° C. with agitation at autogenous pressure for about three hours, thereafter acidifying the reaction mixture and separating therefrom o,o'-thiodiphenol.

2. A method for the preparation of o,o'-thiodiphenol, which method comprises forming a reaction mixture comprising phenothioxin, an alkali metal hydroxide, water, and a lower aliphatic alcohol, the alkali metal hydroxide being present in amount corresponding to at least two mole weights per mole weight of phenothioxin and to from 20 to 40 percent by weight of the reaction mixture, and the water being present in amount corresponding to from 2 to 10 percent by weight of the reaction mixture, and heating the resulting reaction mixture at a temperature between about 125° and about 240° C. at a pressure of at least the autogenous pressure until the phenothioxin is converted substantially to o,o'-thiodiphenol.

3. A method according to claim 2 wherein the alcohol is methanol.

4. A method for the preparation of o,o'-thiodiphenol, which method comprises forming a reaction mixture comprising phenothioxin, potassium hydroxide, water, and methanol, the potassium hydroxide being present in amount corresponding to at least two mole weights per mole weight of phenothioxin and to from 20 to 40 percent by weight of the reaction mixture, and the water being present in amount corresponding to from 2 to 10 percent by weight of the reaction mixture, and heating the resulting reaction mixture at a temperature between about 170° and about 210° C. at a pressure of at least the autogenous pressure until the phenothioxin is converted substantially to o,o'-thiodiphenol.

References Cited in the file of this patent

Mauthner I, Berichte 38, 1411 (1905).
Mauthner II, Berichte 39, 1350 (1906).
Hughes et al.: J. Proc. Roy Soc. N. S. Wales 83, 269 (1950), also found in Burwell, "Chem. Rev. 54, 661 and 677."